(12) United States Patent
Shin et al.

(10) Patent No.: US 9,471,140 B2
(45) Date of Patent: Oct. 18, 2016

(54) VALID CONTEXT STATUS RETENTION IN PROCESSOR POWER MODE MANAGEMENT

(71) Applicants: Texas Instruments Incorporated, Dallas, TX (US); Texas Instruments Deutschland GmbH, Freising (DE)

(72) Inventors: Kazunobu Shin, Plano, TX (US); Siva Srinivas Kothamasu, Bangalore (IN); James John Doublesin, Allen, TX (US); Roland Volker Bucksch, Buch am Erlbach (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 197 days.

(21) Appl. No.: 14/304,795

(22) Filed: Jun. 13, 2014

(65) Prior Publication Data

US 2015/0362987 A1    Dec. 17, 2015

(51) Int. Cl.
*G06F 1/32*    (2006.01)

(52) U.S. Cl.
CPC ............. *G06F 1/3296* (2013.01); *G06F 1/324* (2013.01); *G06F 1/3287* (2013.01)

(58) Field of Classification Search
CPC .................................................... G06F 1/3287
See application file for complete search history.

(56) References Cited

U.S. PATENT DOCUMENTS

| 2008/0010473 | A1* | 1/2008 | Harris ................... | G06F 1/3203 713/300 |
| 2009/0204837 | A1* | 8/2009 | Raval .................... | G06F 1/3203 713/330 |
| 2009/0292934 | A1* | 11/2009 | Esliger ................. | G06F 1/3203 713/323 |
| 2013/0124895 | A1* | 5/2013 | Saha ........................ | G06F 1/26 713/323 |

* cited by examiner

*Primary Examiner* — Albert Wang
(74) *Attorney, Agent, or Firm* — Ronald O. Neerings; Frank D. Cimino (57) ABSTRACT

A system having multiple power mode types, for example, includes a power manager that is responsive to a selection of a suspend power mode type for maintaining processor context information in volatile memory while the processor is in the selected suspend mode. A status register is arranged to retain the status of the context information in the volatile memory while the processor is in the selected suspend power mode. The power manager is arranged to selectively apply power to various voltage domains in response to the type of power mode selected. The processor is optionally arranged to signal the power manager of transitions to the selected suspend mode and of transitions to an active mode using a power enable signal.

20 Claims, 5 Drawing Sheets

| POWER CHANNELS | PROCESSOR POWER SUPPLY | ACTIVE | DeepSleep SUSPEND | RTC-ONLY SUSPEND | RTC-ONLY WITHOUT SUSPEND | OFF |
|---|---|---|---|---|---|---|
| VDD_RTC | RTC CORE | ON | ON | ON | ON | OFF |
| VDDS_RTC | RTC IO | ON | ON | ON | ON | OFF |
| DCDC1 | MPU | ON | ON | OFF | OFF | OFF |
| DCDC2 | CORE | ON | ON | OFF | OFF | OFF |
| DCDC3 | 1.2V LS1 AND LPDDR2 | ON | ON | ON | OFF | OFF |
| DCDC4 | 3.3V IO AND ANALOG | ON | ON | OFF | OFF | OFF |
| LDO1 | 1.8V IO AND ANALOG | ON | ON | OFF | OFF | OFF |
| LS1 | 1.2V DDR I/F | ON | ON | OFF | OFF | OFF |
| LDO2 | 1.8V LPDDR2 | ON | ON | ON | OFF | OFF |

VALID CONTEXT STATUS RETENTION IN PROCESSOR POWER MODE MANAGEMENT

BACKGROUND

Electronic circuits are designed using increasingly greater integration and/or smaller design features to attain increased processing power and/or lowered power consumption. Such electronic circuits often include power management circuits for controlling power consumption of the electronic circuits. The power consumption is controlled, for example, by selectively applying power. As the complexity of such electronic circuits increases, the power management circuits also grow in complexity. In addition, the increasing portability of such devices places further demands on the power management circuits to provide longer operating times while operating under battery power.

SUMMARY

The problems noted above can be solved in large part by power mode management of processor context method and system. A system having multiple power mode types, for example, includes a power manager that is responsive to a selection of a suspend power mode type for maintaining processor context information in volatile memory while the processor is in the selected suspend mode. A status register is arranged to retain the status of the context information in the volatile memory while the processor is in the selected suspend power mode. The power manager is arranged to selectively apply power to various voltage domains in response to the type of power mode selected. The processor is optionally arranged to signal the power manager of transitions to the selected suspend mode and of transitions to an active mode using a (for example) single power enable signal.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion. The term "calibration" can include the meaning of the word "test." The term "input" can mean either a source or a drain (or even a control input such as a gate where context indicates) of a PMOS (positive-type metal oxide semiconductor) or NMOS (negative-type metal oxide semiconductor) transistor.

Figure 1:
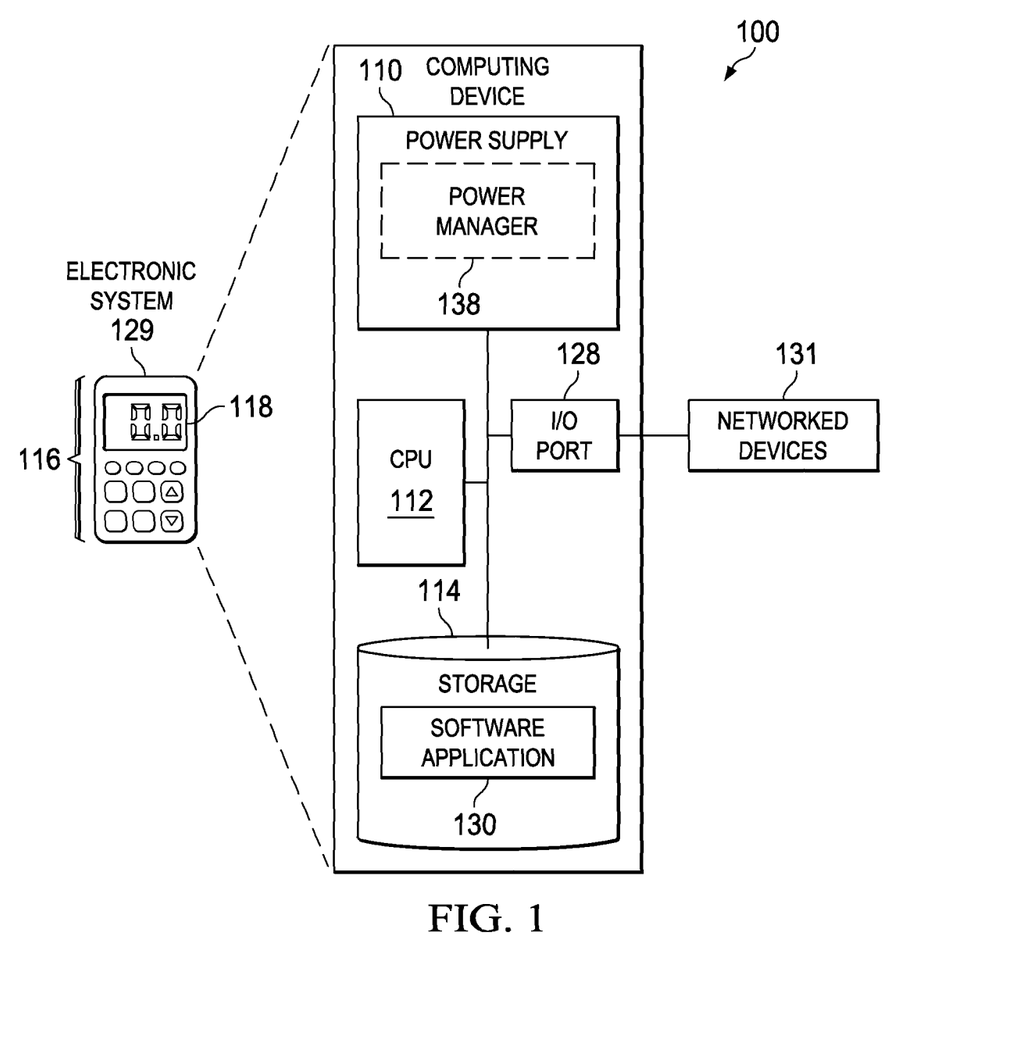
FIG. 1 shows an illustrative electronic device in accordance with example embodiments of the disclosure.

FIG. 1 shows an illustrative computing device 100 in accordance with preferred embodiments of the disclosure. For example, the computing device 100 is, or is incorporated into, an electronic system 129, such as a computer, electronics control "box" or display, communications equipment (including transmitters), or any other type of electronic system arranged to generate radio-frequency signals.

In some embodiments, the computing device 100 comprises a megacell or a system-on-chip (SoC) which includes control logic such as a CPU 112 (Central Processing Unit), a storage 114 (e.g., random access memory (RAM)) and a power supply 110 power manager 138. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing device 100.

The CPU 112 comprises memory and logic that store information frequently accessed from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like. The CPU 112 and power supply 110 is coupled to I/O (Input-Output) port 128, which provides an interface that is configured to receive input from (and/or provide output to)

networked devices 131. The networked devices 131 can include any device (including test equipment) capable of point-to-point and/or networked communications with the computing device 100. The computing device 100 can also be coupled to peripherals and/or computing devices, including tangible, non-transitory media (such as flash memory) and/or cabled or wireless media. These and other input and output devices are selectively coupled to the computing device 100 by external devices using wireless or cabled connections. The storage 114 can be accessed by, for example, by the networked devices 131.

As further described below, the power supply 110 comprises power generating and control components for generating power to enable the computing device 100 to executed the software application 130. For example, the power supply 110 provides one or more power switches, each of which can be independently controlled (by power manager 138, for example), that supply power at various voltages to various components of the computing device 100. The computing device 100 can operate in various power-saving modes wherein individual voltages are supplied (and/or turned off) in accordance with a selected power-saving mode and the components arranged within a specific voltage domain. Although the power manager 138 is illustrated as being included in the power supply 110, the power manager 138 (and/or portions of the power manager 138) can be included in the same module (e.g., as provided by a die as produced in semiconductor) or a different module as the power supply 110.

The CPU 112 is coupled to I/O (Input-Output) port 128, which provides an interface that is configured to receive input from (and/or provide output to) peripherals and/or computing devices 131, including tangible (e.g., "non-transitory") media (such as flash memory) and/or cabled or wireless media (such as a Joint Test Action Group (JTAG) interface). These and other input and output devices are selectively coupled to the computing device 100 by external devices using wireless or cabled connections. The CPU 112, storage 114, and power supply 110 are also coupled to a power supply (not shown), which is configured to receive power from a power source (such as a battery, solar cell, "live" power cord, inductive field, fuel cell, and the like).

As discussed below with reference to the following figures, the power supply 110 and the power manager 138 are arranged, for example, to support multiple power modes that are often required for various low power applications. The multiple power modes include a low power mode in which power is supplied for maintaining information in one or more external memories. Often, the external memories are of a type that would otherwise lose information when power is removed from the external memories or when the external memories are not properly refreshed. Such memories are referred to as being volatile memories (in comparison with EEPROM, for example, which is referred to as being a non-volatile memory).

One type of a suspend mode is an "RTC-only Suspend" power mode in which a processor suspends processing (which saves power by not clocking the processor or by not applying the power to the processor). Accordingly, the processor is prevented from accessing or modifying information in the external memories when in this type of suspend mode. When exiting from this type of suspend mode, a fast reboot of the processor can be performed by restoring a valid context state to the processor from reading information stored in the external memories (e.g., as compared with information stored on a disk drive). The externally stored information is typically verified as being valid before retrieving the externally stored context information as the currently restored state of a processor and resuming normal (e.g., active state) processing.

In various embodiments, the power manager 138 is arranged to execute power mode state transitions (e.g., to go into, remain in, or exit from a suspend state) in conjunction with saving, identifying and restoring state information stored in the external memories. In a first embodiment, the processor (e.g., CPU 112) executes code sequences for saving, identifying and restoring state information stored in the external memories when transitioning between states. In a second embodiment, the power manager 138 is arranged for saving, identifying and restoring state information stored in the external memories when transitioning between states. In a third embodiment, peripheral circuitry (such as a direct memory access controller) is arranged for saving, identifying and restoring state information stored in the external memories when transitioning between states. In other embodiments, any combination of the power manager 138, processor, and peripheral circuitry are arranged for saving, identifying and restoring state information stored in the external memories when transitioning between states.

Figure 2:
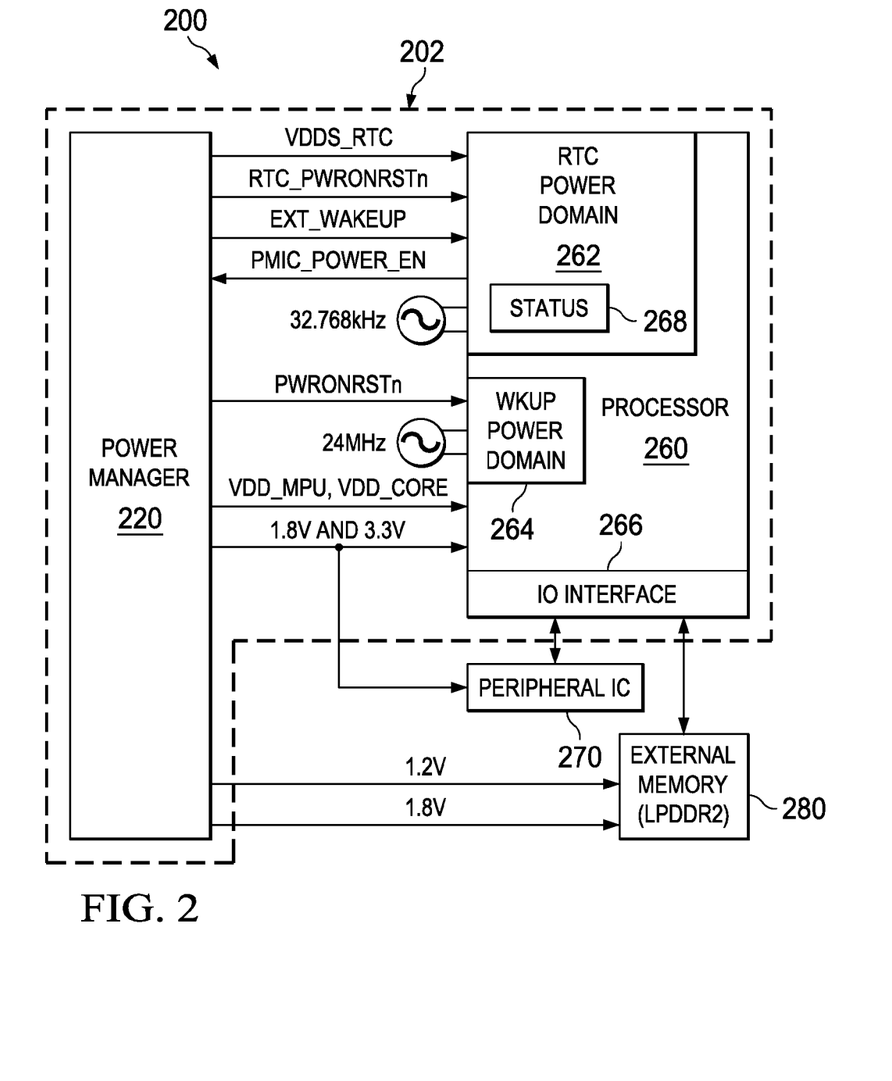
FIG. 2 is a system diagram illustrating low power management of processor context information in accordance with example embodiments of the disclosure.

FIG. 2 is a system diagram illustrating low power management of processor context information in accordance with example embodiments of the disclosure. Generally described, system 200 is an example processing system that is arranged to support power management schemes that protect and maintain information in external memory and to support various power modes and architectures that use the external memory. Accordingly, system 200 is a low power-consumption system that is suitable for battery operated systems that include dual-voltage I/O (input/output) addressing interfaces.

System 200 includes, for example, power manager 220, processor 260, one or more peripheral integrated circuits (IC) 270, and one or more external memories such as LPDDR2 (low power double data rate revision 2) memory 280. The power manager 220 and processor 260 are optionally arranged on a common substrate as portions of an SoC (system on chip) 202, while the one or more peripheral integrated circuits 270 and the one or more external memories 280 are formed and arranged using a silicon substrate that is separate from the SoC 202 silicon substrate. In general, the power manager is arranged to selectively apply power to one or more voltage domains, including the RTC (real-time clock) voltage domain 262 and WKUP (wake-up) voltage domain 264 of the processor 260.

In an embodiment, the system 200 consumes less than 2 mW (milliwatts) of power (e.g., over a majority of time in which the system is) in a low power mode such as the RTC-only with Memory Suspend mode. The RTC-only with Memory Suspend mode maintains a current state of the information stored in the external memories 280 while substantially powering down (and/or maintaining a state where substantially no power is consumed) to the processor. In the RTC-only with Memory Suspend mode, the RTC voltage domain 262 is powered, while other voltage domains of the processor 260 (including WKUP voltage domain 264) are not powered. Powering the RTC voltage domain 262 during the RTC-only with Memory Suspend mode allows, for example, the RTC to maintain a current time value (e.g., without drawing current from a coin cell battery) and to handle requests to wake up the processor 260.

In the RTC-only with Memory Suspend mode, all the processor power supplies are turned off with the exceptions of (at least) the RTC power supply and the external memory and memory interface power supply. In the RTC-only with Memory Suspend mode, the total power consumed by processor 260 is less than 0.1 mW (e.g., where the SoC is formed using typical semiconductor manufacturing processes). Also in the RTC-only with Memory Suspend mode, sufficient power is supplied to keep the external memory (e.g., LPDDR2) memory and control logic in a self-refresh mode that typically consumes around 1.4 mW. Accordingly, a power budget of less than 2 mW is attained in the RTC-only with Memory Suspend mode by system 200.

System 200 is arranged with control circuitry (e.g., power manager 220) to control the (external) LPDDR2 power supply state in transitioning to and from the RTC-only Memory Suspend mode. For example, the power manager 220 is arranged to maintain the power (e.g., 1.2 Volts and 1.8 Volts) applied to the external memory while transitioning to and from RTC-only Memory Suspend mode. The maintaining of power to the external memory 280 prevents the loss of memory information that would otherwise occur in a volatile memory when power is removed.

The status 268 of the external memory is saved and updated in a memory register within the RTC voltage domain 262. Saving the status 268 of the external memory in the RTC voltage domain 262 helps prevent the loss of the status 268 that would otherwise occur in a volatile memory when power is removed. Accordingly, the status 268 of the external memory is relatively easily ascertained (e.g., without having to resort to power- and time-consuming checksum and other such data validation algorithms). When the external memory holds a context of the processor that is powered down, the context information of the processor can be rapidly retrieved and restored such that the processor is rapidly brought from the powered down state to an active state in which resumes executing the saved context information.

The processor 260 can be "woken up" by an externally generated signal or by an internally generated signal such as a wakeup signal asserted by an RTC in the RTC voltage domain 262 (which remains powered up in the RTC-only Memory Suspend mode). In response to the assertion of the PMIC PWR_EN signal, the power manager 220 is woken up (the voltage domain for control circuitry of power manager 220 remain optionally energized to reduce latency) and in response asserts the power on reset (PWRONRSTn) signal, and the VDD_MPU (voltage drain supply math processor unit), VDD_Core, and the 1.8 Volt and 3.3 Volt power signals. The PWRONRSTn signal is applied to the WKUP voltage domain 264 to enables clock generation circuitry and assert resets signal in preparation for powering up the oscillator, IO interface 266, and power rails of circuitry on the SoC 202. In an embodiment, the wakeup latency of the hardware is less than 100 msec. (milliseconds).

Figure 3:
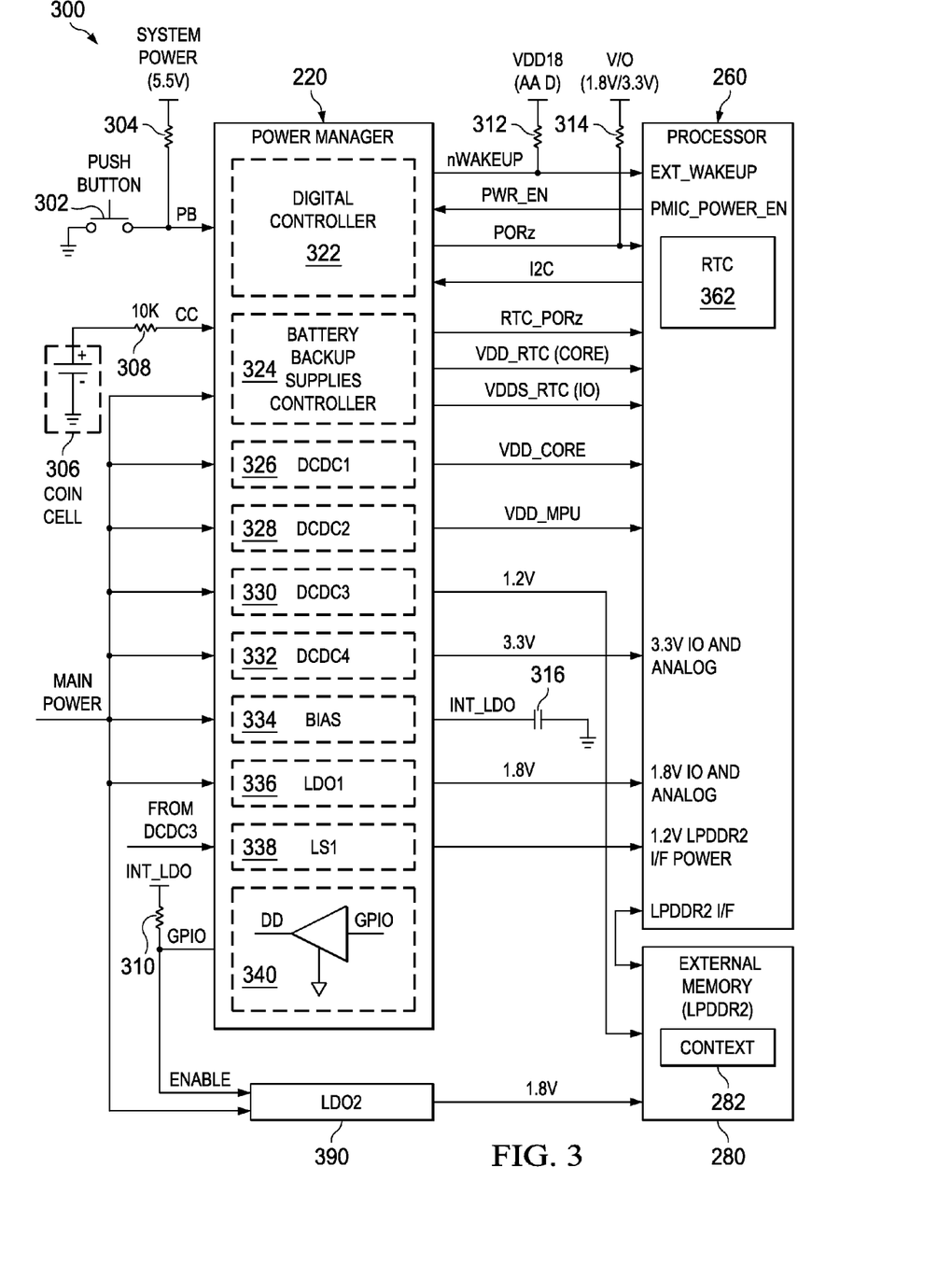
FIG. 3 is a connection diagram illustrating a power manager for low power management of processor context information in accordance in accordance with example embodiments of the disclosure.

FIG. 3 is a connection diagram illustrating a power manager for low power management of processor context information in accordance in accordance with example embodiments of the disclosure. In various embodiments, system 300 includes a power manager 220 that is arranged to power or control devices while entering, remaining in, or exiting various low power modes such as the RTC-only Memory Suspend mode.

Power manager 220 includes a state machine such as a digital controller 322 that is arranged to respond to state information and conduct transitions between various power mode states (including low power modes). The digital controller 322 is arranged to exit from a low (or no) power state in response to, for example, a depression of push button switch 302 by a user. The closing of the push button switch 302 by the user pulls down the voltage a terminal of resistor 304, which is coupled to the PB (push button) input of the power manager 220. The digital controller 322 is arranged to assert the negated wakeup (nWAKEUP) signal by pulling the voltage down at a terminal of resistor 312. The wakeup signal is coupled to the external wakeup (EXT_WAKEUP) pin of the processor 260.

In conjunction with (or as an alternative to) the external wakeup signal, the processor 260 is arranged to self-generate an internally generated wakeup signal, such as in response to the an expiration of a timer in the RTC 362 (which remains powered up during the RTC-only Memory Suspend mode). In response to the detection of a wakeup signal (externally or internally generated) the processor 260 is arranged to assert the power manager integrated circuit power enable signal (PMIC_PWR_EN) to power up the power manager 220 while exiting from the RTC-only Memory Suspend mode.

The assertion of the power manager integrated circuit power enable signal is detected at the power enable (PWR_EN) pin of the power manager 220. In response to the detection of the power enable signal, the digital controller 322 asserts the power-on reset signal (PORz). In response to the assertion of the power-on reset signal, the voltage at a terminal of resistor 314 is pulled low such that a reset signal is arranged to reset portions of the processor 260 in preparation for powering up the processor 260.

Accordingly, the digital controller 322 of the power manger 220 is arranged to be signaled using a single pin to exit from the RTC-only Memory Suspend mode and does not necessarily require additional external power management logic or external non-volatile memory such as electrically erasable programmable read-only memory (EEPROM) in order to be woken up from the various low power modes (described below with respect to FIG. 4).

The power manager 220 also includes battery backup supplies controller 324. The battery backup supplies controller 324 is arranged to provide power from a battery backup (such as coil cell 306) when main power (such as provided by line power or high-capacity batteries) is not available or not selected. The power provided by coin cell 306 is current limited by resistor 308.

When, for example, a sufficiently charged coin cell 306 is coupled to the power manager 220, the power manager 220 is arranged to signal an event that a valid voltage has been detected at pin CC (coin cell) of the power manager 220. In response to the valid CC voltage detection event, the battery backup supplies controller 324 is arranged to assert an RTC power-on reset signal (RTC_PORz). In response to the assertion of the RTC power-on reset signal, the RTC 362 is arranged to be reset.

The battery backup supplies controller 324 is also arranged to supply power to the RTC core and IO via power signals VDD_RTC and VDDS_RTC, respectively. For example, the power signals VDD_RTC and VDDS_RTC are powered from the main power signal when available, and are power from the coin cell 306 when the coin cell 306 is sufficiently charged and the main power is not available.

The main power signal provides operating power for the system 300 and is typically derived from line current (such as provided via a building power distribution system) and/or high-capacity batteries (such as a rechargeable battery). The power manager 220 also includes power channels wherein the power channel is selectively actuated. The term "actuated" includes the meanings of being coupled to or decoupled from, turned on or turned off, applied to or removed from, and the like.

The power channels include voltage converters and supplies that are powered (e.g., directly or indirectly) from the main power signal. The voltage converters include DCDC1 (DC-to-DC converter 1) 326, DCDC2 328, DCDC3 330, DCDC4 332, BIAS 334, and LDO1 (low-dropout voltage supply 1). Each such power channel is arranged to selectively apply a voltage to the processor 260 and/or the external memory 280 in accordance with a selected power mode as discussed below. For example, the DCDC3 330 is arranged to apply 1.2 Volts to the external memory 280 when operating in the RTC-only Memory Suspend mode.

Power channels of the power manager 220 can be used to supply power to other power supplies of the power manager 220. For example, the DCDC3 330 is arranged to apply 1.2 Volts to the load switch (LS1) 338 when operating in the RTC-only Memory Suspend mode. The output voltage of LS1 is applied to the processor 220 for powering interface logic of the processor 260 that is coupled to the external memory 280. Accordingly external memory 280 is arranged to maintain a stored context (information) 282 of the processor 260 while the system 300 is operating in the RTC-only Memory Suspend mode.

The BIAS 334 supply is arranged to generate a low dropout voltage. The INT_LDO (internal low dropout output) of the LDO1 supply 336 is coupled to a storage capacitor 316 and to a first terminal of resistor 310, which is used as a pull-up resistor for a GPIO (general purpose input/output) interface bus. Driver 340 (which can be instantiated one or more times to provide for one or more bus signals) is arranged to communicate with LDO2 390 as an enable pin of the LDO2 390 supply. The LDO2 390 supply is arranged to selectively apply 1.8 Volts to the external memory 280 in accordance with a selected power mode (such as the RTC-only Memory Suspend mode). The selection of the LDO2 output voltage is communicated from the power manager 220 to the LDO2 390 power supply via the GPIO bus.

Figure 4:
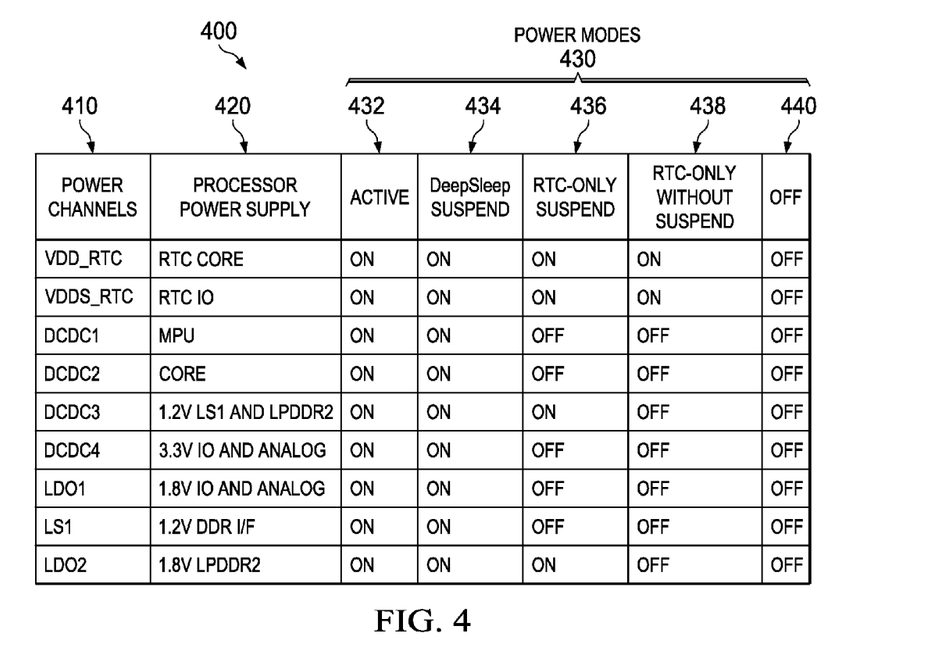
FIG. 4 is a logic diagram illustrating power modes for low power management of processor context information in accordance with example embodiments of the disclosure.

FIG. 4 is a logic diagram illustrating power modes for low power management of processor context information in accordance with example embodiments of the disclosure. Table 400 includes columns 410 and 420. Column 410 includes a listing of the power channels illustrated in FIG. 3. Column 420 includes a description of power channels where each description describes an associated power channel listed in column 410.

Power modes group 430 includes each type of the power modes respectively described in columns in 432, 432, 434, 436, 438, and 440. Power mode 432 is the Active power mode. In the Active power mode, for example, all circuitry is typically powered up and clocked to minimize latency and optimize the performance of the system (such as system 300). In the Active power mode, the power channels VDD_RTC, VDDS_RTC, DCDC1, DCDC2, DCDC3, DCDC4, LDO1, LS1, and LDO2 are turned on and selected. In the Active power mode, no power channel is typically turned off and accordingly the Active power mode typically has the highest rate of power consumption of all of the power modes.

Power mode 434 is the Deep Sleep Suspend power mode. In the Deep Sleep Suspend power mode, for example, all circuitry is typically powered up but is not clocked (e.g., by using clock gating) to minimize power consumption resulting from clocking of CMOS gates of the system (such as system 300). In the Deep Sleep Suspend power mode, the power channels VDD_RTC, VDDS_RTC, DCDC1, DCDC2, DCDC3, DCDC4, LDO1, LS1, and LDO2 are turned on and selected. In the Deep Sleep Suspend power mode, no power channel is turned off such that operation of the system can be quickly resumed by enabling one or more clocks of the system.

Power mode 436 is the RTC-only Suspend power mode. In the RTC-only Suspend power mode, for example, small portions of the system are typically powered up (and refreshed) to minimize latency of restoring operation of the system. In the RTC-only Suspend power mode, the power channels VDD_RTC, VDDS_RTC, DCDC3, and LDO2 are turned on and selected. In the RTC-only Suspend power mode, the DCDC1, DCDC2, DCDC4, LDO1, and LS1 power channels are turned off. Accordingly the RTC-only Suspend power mode typically has a low rate of power consumption while maintaining the state of the RTC (including the status of the external memory) and the state of the external memory (which typically is placed in a self-refresh mode while the system is in the RTC-only Suspend power mode).

Power mode 438 is the RTC-only Without Suspend power mode. In the RTC-only Without Suspend power mode, for example, the RTC is typically powered up. In the RTC-only Suspend power mode, the power channels VDD_RTC and VDDS_RTC and are turned on and selected. In the RTC-only Suspend power mode, the DCDC1, DCDC2, DCDC3, DCDC4, LDO1, LS1, and LDO2 power channels are turned off. Accordingly the RTC-only Suspend power mode typically has a very low rate of power consumption while maintaining the state of the RTC circuitry (which maintains an active state of the RTC used for internally generated wakeup signals).

In the Off power mode 440, for example, all circuitry is typically powered off to substantially minimize (if not eliminate) power consumption of the system. In the Off power mode, all power channels VDD_RTC, VDDS_RTC, DCDC1, DCDC2, DCDC3, DCDC4, LDO1, LS1, and LDO2 are turned off and are unselected. In the Off power mode, no power channel is turned on and accordingly the Off power mode typically has the lowest (if any) rate of power consumption of all of the power modes.

Figure 5:
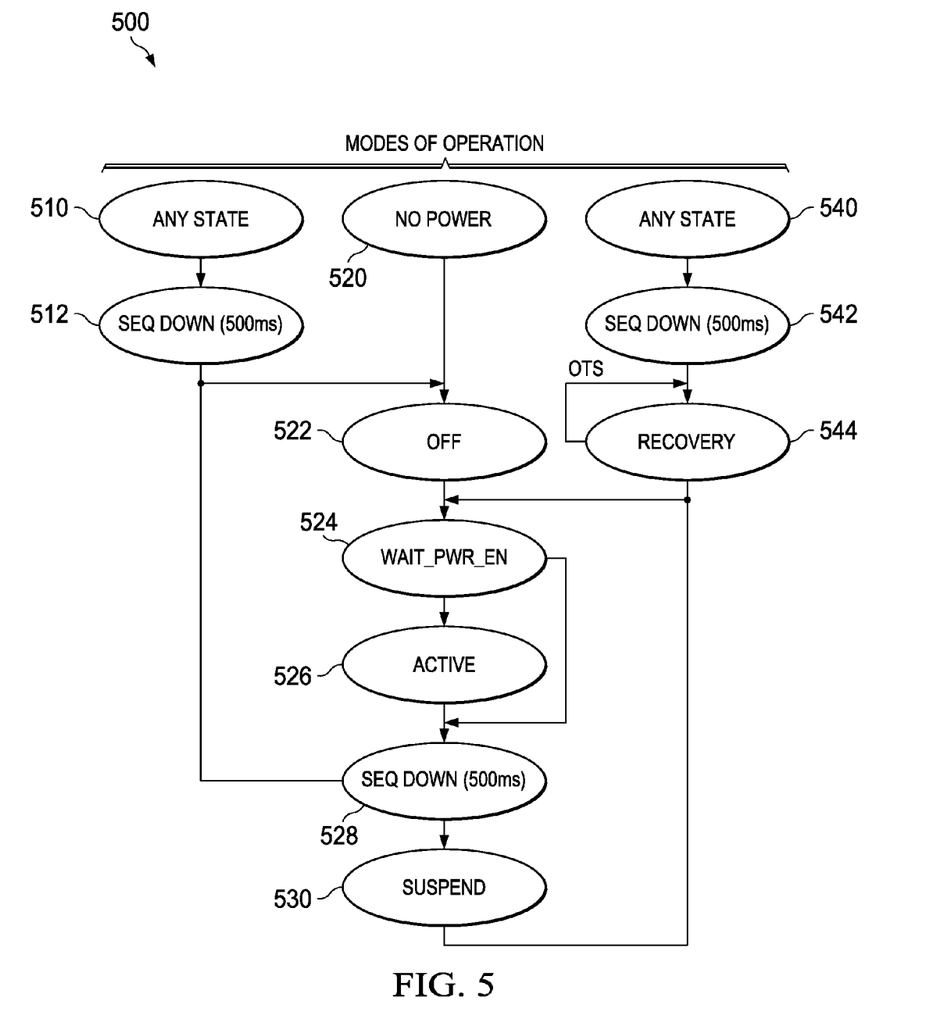
FIG. 5 is a state diagram illustrating power management states for low power management of processor context information in accordance with example embodiments of the disclosure.

FIG. 5 is a state diagram illustrating power management states for low power management of processor context information in accordance with example embodiments of the disclosure. Diagram 500 includes three entry states, one of which is determined upon circumstances that exist when the state machine of a system having data-state low power management (such as system 200) is in an undefined state.

State 510 is entered from an undefined state when one or more supply voltages (e.g., where a supply voltage is a voltage of a power supply used to supply power to system) falls below a threshold that is associated with a given supply voltage. When the determination is made that the state machine is in state 510, the state of the state machine proceeds to state 512 (SEQ DOWN).

In state 512 (SEQ DOWN), the state machine directs the system enter and execute a shutdown sequence. The shutdown sequence is arranged to provide an orderly shutdown of all power channels in period of time that is around 500 msec. or less. When the shutdown sequence is completed, the state of the state machine proceeds to state 522 (OFF). State 522 (OFF), can also be entered from state 520.

State 520 is entered from an undefined state when it is determined that no power is being supplied from the power sources used to supply power to the system. For example, the determination can be made when external power is absent and a coin cell battery is removed. When the determination is made that the state machine is in state 520, the state of the state machine proceeds to state 522 (OFF).

In state 522 (OFF), the state machine directs the system to remain in an Off state until a wakeup condition is determined. In the Off state, the power channels are generally powered down and/or deselected. A wakeup condition is determined when, for example, a supply voltage rises above a threshold that is associated with a given supply voltage and either or both the external reset push is depressed or the power enable signal is low. When the wakeup condition is determined, the state of the state machine proceeds to state 524 (WAIT_PWR_EN). State 524 (WAIT PWR_EN) can also be entered from state 540 via state 542.

State 540 is entered from an undefined state when it is determined that one or more reset conditions are encountered. A reset condition is determined when, for example, the external reset button is depressed for more than eight seconds, an over-temperature shutdown is encountered, or a power fault (or other such system error) is detected. When the reset condition is determined, the state of the state machine proceeds to state 542 (SEQ DOWN).

In state 542 (SEQ DOWN), the state machine directs the system enter and execute a shutdown sequence. The shutdown sequence is arranged to provide an orderly shutdown of all power channels in period of time that is around 500 msec. or less. When the shutdown sequence is completed, the state of the state machine proceeds to state 544 (RECOVERY).

In state 544 (RECOVERY), the state machine directs the system to retain the power channels DCDC1-4 in a powered off condition and to turn on the LDO-related power channels. The state machine remains in the state 544 while the OTS is active. If an OTS is not active is determined, the state of the state machine proceeds to state 524 (WAIT_PWR_EN).

In state 524 (WAIT_PWR_EN), the state machine directs the system to turn on all power channels. In state 524 (and state 526) the processor (e.g., processor 260) has the option to direct the power manager (e.g., power manager 220) to enter a suspend mode by deasserting (e.g., pulling low) the power enable (PWR_EN) signal. For example, if a timeout period (e.g., 5-20 seconds) has expired and the reset button has not been pressed and the power enable signal is deasserted, the state of the state machine enters state 528 (SEQ DOWN) where it is determined whether to shut down or enter the suspend mode. If the power enable signal has not been deasserted (e.g., to cause the state machine to shut down or enter the suspend mode within a programmably selected time period that is, for example, selected from a range of 5-20 seconds), the state of the state machine enters state 526 (ACTIVE).

In state 526 (ACTIVE), the state machine directs the system to maintain all power channels in a powered state. While in state 526, the processor operates normally and determines a target power mode for using when exiting the active state (state 526). For example, the processor selects a mode (e.g., the RTC-only suspend mode) and determines the power supplies that are to be powered down and/or the power supplies that are to remain powered up.

When entering the RTC-only suspend mode, the processor sets an RTC alarm wakeup and/or EXT_WAKEUP pin event. The processor also saves the processor context (which includes register contents) to the external memory (such as LPDDR2 memory) and sets the external memory in a self-refresh mode (or other power-saving mode where memory contents are retained). The processor sets one or more status flags in the RTC register to indicate whether the processor context has been saved and/or whether the external memory is in a self-refresh (or other power-saving mode). When the target power mode is the RTC-only suspend mode, the power channels DCDC3 and GPIO1 are determined (e.g., flagged) to remain powered on in the target power mode to maintain the memory contents of the external memory. The voltage domains for the core and I/O interface are (e.g., optionally) left powered up (e.g., to hasten resumption of an active mode). The processor then deasserts the power enable (PWR_EN) signal to start power supply state transitioning to a suspend mode state as described below.

When determining that the active mode is to be exited (e.g., regardless of which target power mode is determined), the processor directs the power manager to enter a suspend mode by deasserting (e.g., pulling low) the power enable (PWR_EN) signal. When the power enable signal is deasserted, the state of the state machine enters state 528 (SEQ DOWN) where it is determined whether to shut down or enter the suspend mode.

In state 528 (SEQ DOWN), the state machine determines whether to shut down or enter the suspend mode. For example, the state machine determines which, if any, power channels are to be left on. When the condition exists that no power channels are to be left on, the state machine directs the system enter and execute a shutdown sequence as described above with reference to state 512 or state 524, for example. When the shutdown sequence has terminated, the state of the state machine proceeds to state 522 (OFF). When the condition exists that some (or all) power channels are to be left on in a low power (e.g., suspend) mode, the state machine directs the system enter a shutdown sequence for the power channels that are deselected (e.g., to be shut down). When the shutdown sequence for each deselected power channel has terminated, the state of the state machine proceeds to state 530 (SUSPEND).

In state 530 (SUSPEND), the state remains in the suspended state (e.g., low power mode) until the RTC wakeup alarm or an external (e.g., push button) wakeup event occurs. In response to an external wake up, the state machine directs the power manager to assert (e.g., pull low) the nWAKEUP signal. In response to the assertion of the nWAKEUP signal or the RTC wakeup alarm event, the processor asserts (e.g., drives high) the power enable (PMIC_PWR_EN) signal. In response to the assertion of the power enable signal, the state machine the state of the state machine proceeds to state 524 (WAIT_PWR_EN).

In state 524 (WAIT_PWR_EN), the state machine directs the system to turn on all power channels (as briefly described above) in to transition to the active power state (state 526). When exiting from the RTC-only suspend mode a sequence for power up all the power channels (except voltage domains and power channels left powered up on during the suspend mode). To resume operation from the saved processor context, the processor executes a ROM boot to load a second program loader (a "resume" program loader, as compared with a fresh boot program loader) into SRAM (such as free space of the external memories). The second program loader configures the PLL (e.g., for generating a system clock) and configuration registers (e.g., of the external memory) and reads the status flags set in RTC scratch register (e.g., to determine if a valid processor context has been saved in the external memory). If the status flag is set (e.g., when the saved context is valid), the second program loader activates (e.g., causes the LPDDR2 to exit from self-refresh mode) the external memory. After the external memory is activated, the processor executes a sequence for restoring the processor context from the external memory. After the context has been loaded, the state of the state machine enters state 526

(ACTIVE), for example, by executing a jump instruction to an address as loaded by the resume program loader as described above.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

The invention claimed is:

1. A system, comprising:
    a volatile memory for storing and accessing information, wherein the volatile memory consumes power in a first voltage domain when storing and accessing the information;
    a processor for writing the information to and reading the information from the volatile memory, wherein the processor consumes power in a second voltage domain when writing the information to and reading the information from the volatile memory, and wherein the processor is arranged to store a context of the processor as context information in the volatile memory in response to an indication of a transition to a first suspend mode type;
    a status register for storing a valid context indication for determining whether a valid processor context of the processor has been stored in the volatile memory, wherein the status register consumes power in a third voltage domain when storing the valid context indication for determining whether a valid processor context of the processor has been stored in the volatile memory;
    a power manager for selectively coupling power to the first, second, and third voltage domains in response to an indication of a transition to an active mode, for decoupling power to the first, second, and third voltage domains in response to an indication of a transition to an off mode, and for coupling power to the first and third voltage domains and decoupling power to the second voltage domain in response to an indication of a transition to the first suspend mode type, and;
    a program loader for restoring the processor context from the volatile memory in response to determining, by reading the stored valid context indication, whether a valid processor context of the processor has been stored.

2. The system of claim 1, wherein the program loader is for causing the volatile memory to exit from a self-refresh mode in response to determining by reading the status register whether a valid processor context of the processor has been stored.

3. The system of claim 2, wherein the processor is arranged to restore the stored context information from the volatile memory in response to an indication of a transition to the active mode.

4. The system of claim 3, wherein the valid context indication is read from the status register in response to the indication of a transition to the active mode.

5. The system of claim 4, wherein the processor is arranged to restore the stored context information from the volatile memory in response to the reading of the context information from the status register.

6. The system of claim 5, wherein power manager is arranged to selectively couple power to the first, second, and third voltage domains in response to an indication of a transition to a second suspend mode type.

7. The system of claim 5, wherein power manager is arranged to selectively couple power to the third voltage domain and to decouple power from the first and second voltage domains in response to an indication of a transition to a third suspend mode type.

8. The system of claim 4, wherein the indication of a transition to the active mode type is asserted in circuitry of the third voltage domain.

9. The system of claim 8, wherein the circuitry of the third voltage domain includes a real time clock (RTC) for generating the indication of a transition to the active mode type.

10. The system of claim 1, wherein the indication of a transition to the active mode type is asserted by an external switch.

11. The system of claim 10, wherein the processor is arranged to notify the power manager of a mode change from a current mode to the first suspend mode type by deasserting a power enable signal, wherein the power enable signal is coupled to the power manager.

12. The system of claim 11, wherein the processor is arranged to notify the power manager of a mode change to the active mode by asserting the power enable signal.

13. The system of claim 1, wherein the power manager is arranged to decouple power from a fourth voltage domain in response to the indication of a transition to the off mode, wherein the fourth voltage domain is arranged to supply power to I/O (input/output) circuitry, wherein the I/O circuitry is used by the processor for writing the information to and reading the information from the volatile memory.

14. The system of claim 1, wherein the system consumes less than 2 milliwatts of power during the first suspend mode type.

15. A circuit, comprising:
    a first voltage domain for coupling to a volatile memory for storing and accessing information in the memory;
    a second voltage domain for coupling to a processor for storing and accessing processor context information in the volatile memory;
    a third voltage domain for coupling to a status register for storing a valid context indication, wherein the context indication provides an indication for determining whether a valid processor context of the processor has been stored in the volatile memory; and
    a power manager that is arranged to selectively couple power to the first, second, and third voltage domains in response to an indication of a transition to an active mode, arranged to decouple power to the first, second, and third voltage domains in response to an indication of a transition to an off mode, and arranged to couple power to the first and third voltage domains and to decouple power to the second voltage domain in response to an indication of a transition to a first suspend mode type, and;
    a program loader for restoring the processor context from the volatile memory in response to determining by reading the status register whether a valid processor context of the processor has been stored.

16. The circuit of claim 15, wherein the stored valid context indication is stored when transitioning to a first-suspend mode and wherein the stored valid context indication is read when exiting from the first-suspend mode.

17. The circuit of claim 15, comprising a real time clock (RTC) for generating the indication of a transition to the active mode type, wherein the stored valid context indication is stored as a status flag of a register of the RTC.

18. A method for selecting power modes, comprising:
coupling a first voltage domain to a volatile memory for storing and accessing information in the memory;
coupling a second voltage domain to a processor for storing and accessing processor context information in the volatile memory;
coupling a third voltage domain to a status register for storing a valid context indication, wherein the context indication provides an indication whether the volatile memory contains valid processor context information;
selectively coupling power to the first, second, and third voltage domains in response to an indication of a transition to an active mode, wherein the processor context from the volatile memory is restored in response to determining, by reading the status register, whether a valid processor context of the processor has been stored, and wherein the processor context from the volatile memory is restored when exiting from a first suspend mode;
selectively decoupling power to each of the first, second, and third voltage domains in response to an indication of a transition to an off mode; and
selectively coupling power to the first and third voltage domains and selectively decoupling power to the second voltage domain in response to an indication of a transition to the first suspend mode.

19. The method of claim 18, wherein the stored valid context indication is stored when transitioning to a first-suspend mode and wherein the stored valid context indication is read when exiting from the first-suspend mode.

20. The method of claim 18, comprising consuming less than 2 milliwatts of power by the volatile memory, the processor, and the status register during a period of time in which the volatile memory, the processor, and the status register are in the first suspend mode.

* * * * *